United States Patent [19]
Kajiwara

[11] Patent Number: 5,325,649
[45] Date of Patent: Jul. 5, 1994

[54] EASILY-ASSEMBLED HOUSING STRUCTURE AND CONNECTORS THEREOF

[75] Inventor: Matsuji Kajiwara, Bellevue, Wash.

[73] Assignee: Nikken Seattle, Inc., Tukwila, Wash.

[21] Appl. No.: 909,599

[22] Filed: Jul. 7, 1992

[51] Int. Cl.⁵ .............................................. E04B 2/32
[52] U.S. Cl. ........................................ 52/582; 52/580;
52/271; 403/340; 403/381
[58] Field of Search ................ 52/593, 595, 586, 582,
52/583, 590, 589, 580, 578, 270, 271; 403/339,
340, 381, 363

[56] References Cited

U.S. PATENT DOCUMENTS

| | | | |
|---|---|---|---|
| 2,021,922 | 11/1935 | Deck | 52/593 X |
| 2,115,036 | 5/1938 | Sterus | 52/593 X |
| 2,257,001 | 9/1941 | Davis | 52/593 X |
| 2,290,369 | 7/1942 | Fleischmann | 52/593 X |
| 3,363,386 | 1/1968 | Elflein | 52/586 |
| 3,609,929 | 10/1971 | Brown et al. | |
| 3,716,954 | 2/1973 | Kelbish | |
| 3,721,052 | 3/1973 | Boel et al. | |
| 3,738,447 | 6/1973 | Rose | |
| 3,758,998 | 9/1973 | Ollis et al. | |
| 3,879,910 | 4/1975 | Waite | |
| 3,940,890 | 3/1976 | Postlethwaite | |
| 4,012,871 | 3/1977 | Netto et al. | |
| 4,090,339 | 5/1978 | Anderson | |
| 4,140,824 | 2/1979 | Gaillard | |
| 4,147,004 | 4/1979 | Dav et al. | |
| 4,170,430 | 9/1979 | Mrotzek | 52/586 X |
| 4,187,655 | 2/1990 | Anderson | |
| 4,304,083 | 12/1981 | Anderson | 52/586 X |
| 4,443,988 | 4/1984 | Coutu, Sr. | |
| 4,455,801 | 6/1984 | Merritt | |
| 4,628,650 | 12/1986 | Parker | |
| 4,646,494 | 3/1987 | Saarinen et al. | |
| 4,787,181 | 11/1988 | Witten et al. | |
| 5,007,222 | 4/1991 | Raymond | 52/586 |

Primary Examiner—Carl D. Friedman
Assistant Examiner—Robert J. Canfield
Attorney, Agent, or Firm—Seed & Berry

[57] ABSTRACT

A housing structure is assembled from panels having interlocking connectors, each connector having a tongue and a groove, a central recess, and end flanges, the connectors being attached to posts of adjacent panels with the tongue of one connector interlocking within the groove of another connector, the tongues and grooves snapping together when fully inserted to lock the panels against separation. A connector of the above description for use in a panel for a housing structure.

13 Claims, 3 Drawing Sheets

EASILY-ASSEMBLED HOUSING STRUCTURE AND CONNECTORS THEREOF

TECHNICAL FIELD

The present invention relates to housing structures of the type used for dwellings, small offices, and the like and to connectors for use in panels forming such housing structures in which the connectors can snap together to lock adjacent panels together.

BACKGROUND OF THE INVENTION

Housing structures that are modular in construction and made from interconnected premanufactured parts designed to be easily and quickly assembled are known. See, for example U.S. Pat. Nos. 4,090,339, 4,443,988, and 4,012,871. While these prior art housing structures have attempted to be easily constructed, they all require special fasteners to hold the panels together and thus take more time than is desirable for their assembly at the construction site into the housing structure.

SUMMARY OF THE INVENTION

This invention provides a preformed panel structure in which there is a connector attached at the factory to a post in the end of a panel. This connector has a forward section with a snap-in tongue protruding from one side and a snap-in groove contained in the other side. Adjacent panels will then have their connectors oppositely directed to one another so that the snap-in tongue of the connector of one panel snaps into and interlocks into the snap-in groove of the connector of the opposite adjacent panel. In this manner, panels can be assembled at the housing site simply by snapping the panels together without the need for a multiplicity of additional fasteners or special tools.

Another important object of the invention is that the connectors provide high strength interconnection between panels. Some of the connectors are adapted to be interfitted with special end connectors having pairs of tongues which form an abutting end wall at right angles to two interconnected panels.

The panels can be in the form of solid panels, door panels, window panels, or inside wall panels.

Another object of the invention is to provide a unique connector that is adapted to be connected to an end of a panel for providing a connection between that panel and an adjacent panel having the same second connector, only with reversed orientation to the first connector.

DETAILED DESCRIPTION OF THE INVENTION

Figure 1:
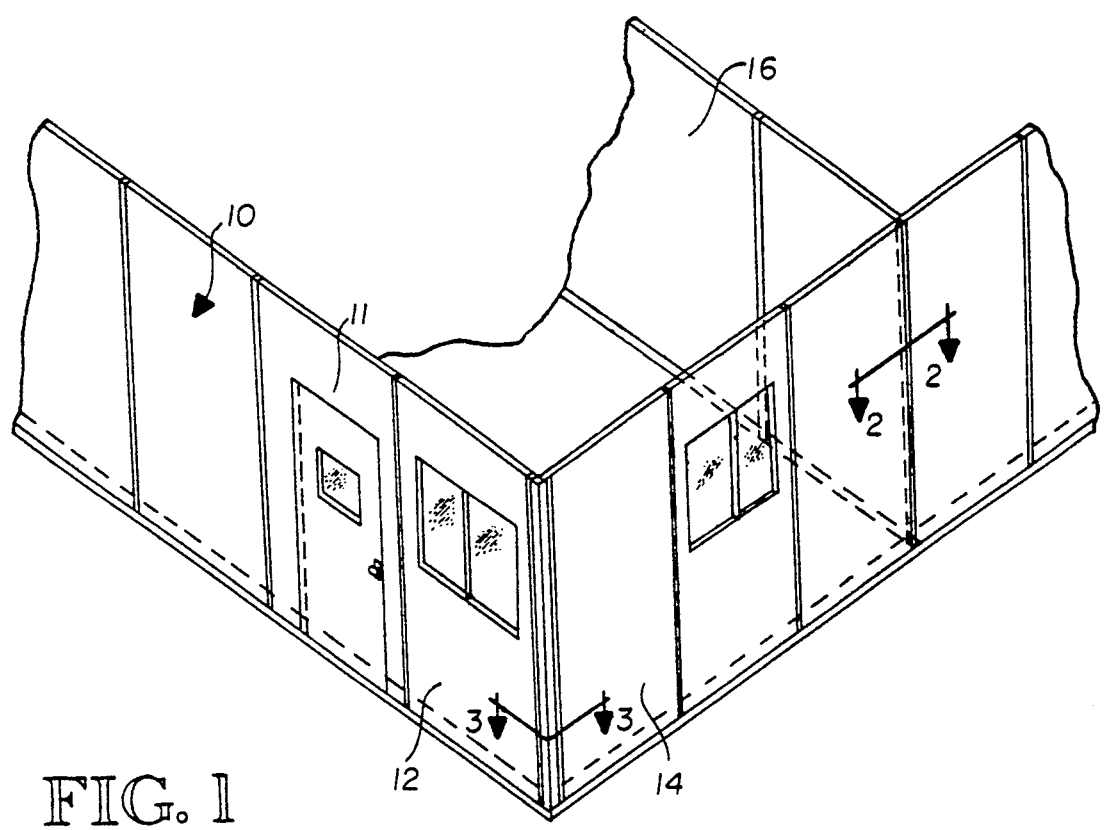
FIG. 1 is a schematic isometric showing a portion of a typical housing structure having panels and connectors employing the principles of the invention.

As best shown in FIG. 1, a typical housing structure, whether a dwelling, office or storage structure, includes a plurality of panels 10, some of which may be a door panel 11, a window panel 12, or a solid panel 14. In addition, there can be inside wall panels 16 located at various positions within the dwelling to divide the dwelling into separate rooms.

Figure 2:
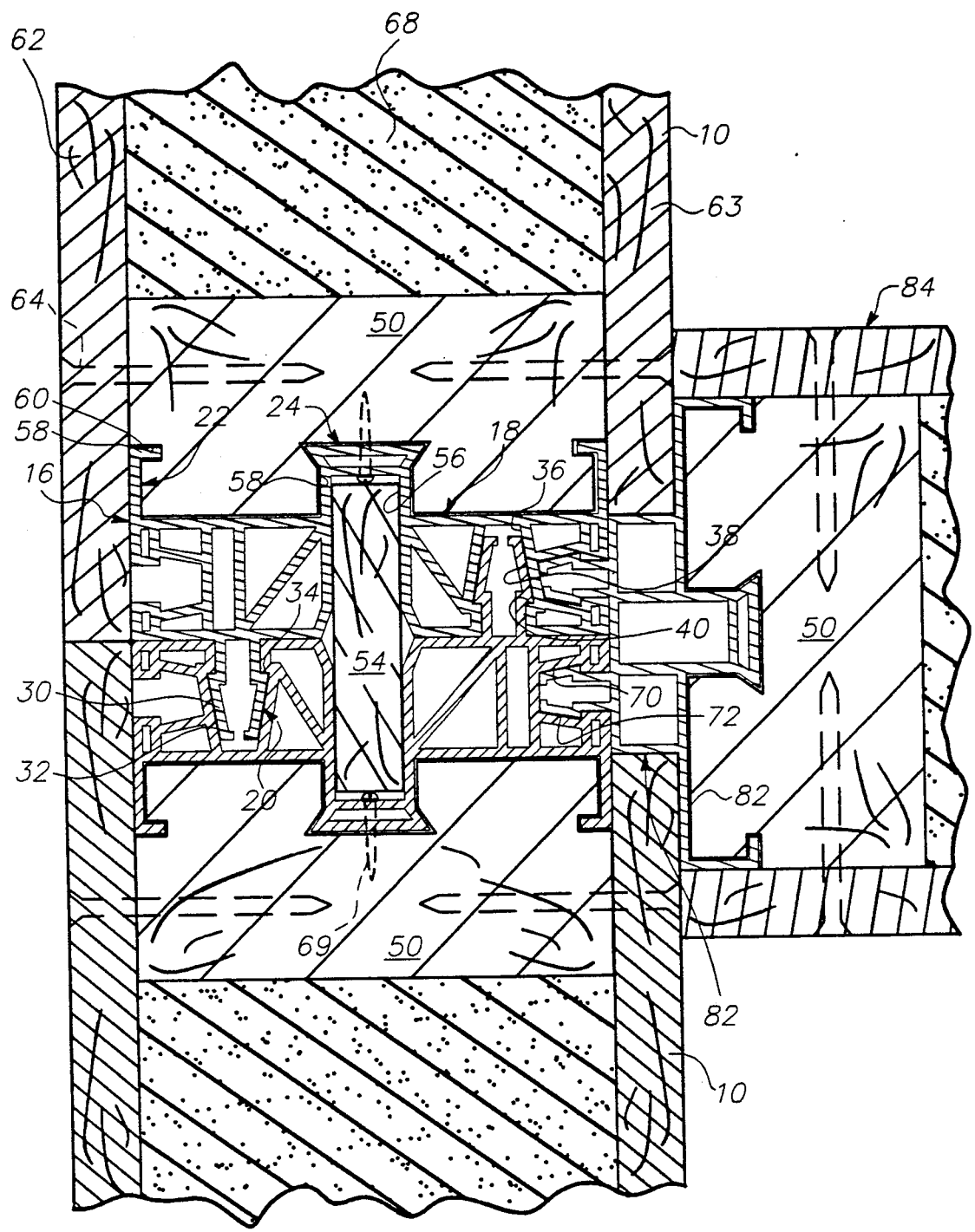
FIG. 2 is a section taken along a line 2—2 of FIG. 1.
Figure 3:
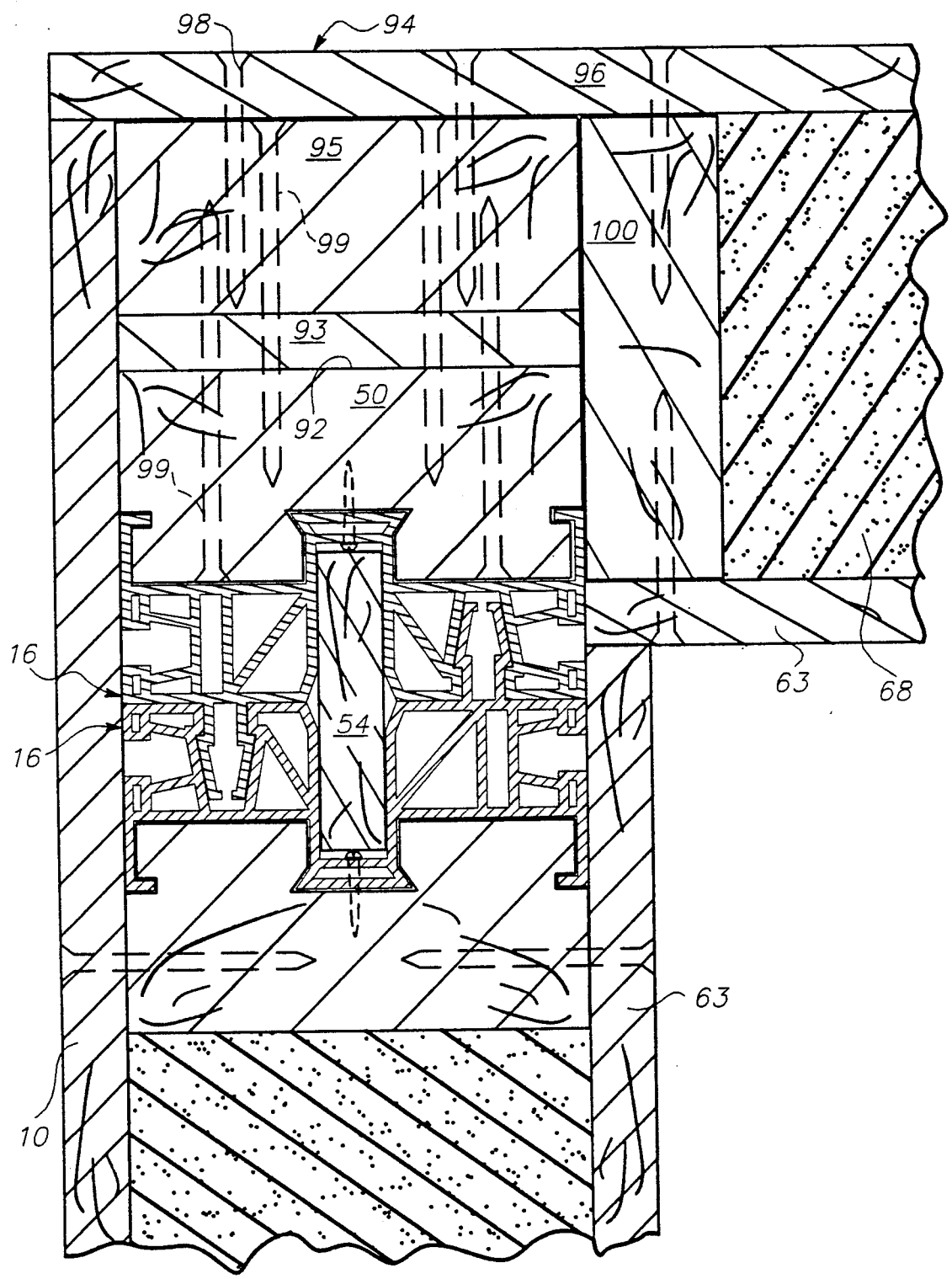
FIG. 3 is a fragmentary section taken along the line 3—3 of FIG. 1.

Each of the panels in a row is connected together by unique connectors 16, best shown in FIGS. 2 and 3. The connectors are made from a strong, inherently elastic material such as plastic. The connector 16 includes a body section 18 having a forward section 20, a rearward section 22, and a central section 24.

The forward section 20 includes a tongue 30 having forwardly-converging side walls 32 and a pair of opposite locking surfaces 34. Each of the forward sections is also provided with a groove 36 having outwardly diverging side walls 38 and lateral intermediate locking surfaces 40. As is best shown in FIG. 2, each panel has an end post 50 to which the connectors are attached. The connectors are attached to panels abutting end to end with the connectors of one panel being exactly reversed from the connector of the other panel.

To interconnect the panels, the tongue and groove of one connector is aligned with the tongue and groove of the opposite connector of the adjacent panel and the two panels are pushed together. Before interlocking the panels together, a bracing member 54 is seated into a central recess 56 of each connector. The central recesses fit within central grooves 58 in the post of the adjacent panels to provide lateral shear strength to the connectors.

When the bracing member is in place, the panel connectors are then inserted into one another with the tongues contracting as they are inserted into the grooves until the locking surfaces on the tongue passes the intermediate locking surfaces on the groove, at which time the tongue sidewalls expand to their normal shape by the inherent elasticity of the material of the connectors, with the locking surfaces on the tongue mechanically interlocking and abutting against the intermediate locking surfaces on the groove so that the panels become interlocked and cannot be separated by pulling in opposite directions in the plane of the panels.

Preferably, the connectors are made of high-strength plastic which can be extruded. The connectors are provided with end flanges 58 on opposite ends which protrude toward one another and fit within side grooves 60 formed in the post. Preferably, the posts are cut and the connectors are installed in the post at the factory by sliding the connectors along the grooves. In the alternative, this can be done at the building site.

Generally, the panels will be made at the factory and will include outer facing sheets 62 constructed of weather resistant material and more smoothly-finished inner-facing sheets 63 to be used as an interior wall. The facing sheets are secured to the posts by suitable fasteners 64. Preferably, the interior of the panel between the facing sheets is filled with a rigid foam such as Styrofoam 68.

The connector is held tightly against the panel also by screws or other fasteners 69 secured through the central recess 56 in the connector.

Each of the connectors also has an end groove 70 of the same configuration and shape as the groove 38. This end groove 70, therefore, can interlock with an end tongue of a shape and configuration the same as the tongue 30. In this manner, a modified end connector 80 having a pair of tongues 72 and a rearward section 82 can be attached also to a post 50 of an end abutting panel 84, with the tongues interlockingly connected within the grooves, as was earlier described.

FIG. 3 shows the identical connectors of FIG. 2. In this form of the invention, however, the post 50 is attached at its rear surface 92 to a spacer bar 93. An outside corner panel 94 has a post 95 and a facing sheet 96. The posts 50 and 95 and the spacer bar 93 are interconnected by fasteners 99. The outer facing sheet is attached to the post 95 by fasteners 98. This panel will thus abut at right angles to an adjacent panel to form a corner of a structure. An additional strengthening bar 100 interconnects the facing sheets 96 and 63 and rigid foam 68 is provided as in the other panels.

The connectors of the invention has been previously described and is intended to include a separate component that can be manufactured separately from the panels.

While the preferred embodiments of the invention have been illustrated and described, it should be understood that variations will be apparent to those skilled in the art. Accordingly, the invention is not to be limited to the specific illustration shown in the drawings.

I claim:

1. An easily-assembled housing structure comprising: a plurality of generally planar panels, at least two of said panels being adjacent first and second panels each having attached snap-together panel connectors having forward facing sections for joining adjacent said first and second panels together to form interconnected panels by pushing them together with abutting confronting locking surfaces, said locking surfaces each being substantially perpendicular to the plane of the panel to which the connector is attached so that the locking surfaces engage one another to prevent unsnapping of the connectors by attempting to pull the panels apart in the direction parallel to the plane of the panels and perpendicular to the forward facing sections, wherein said panels may be interconnected simply by inserting one connector into the other to lock the panels together.

2. The structure of claim 1, said connectors of said interconnected first and second panels being identical but reversed from one another, each connector on each of said first and second panels having a body section joined to the respective panel, a tongue section having enlarged locking surfaces, a groove section having enlarged intermediate locking surfaces, and wherein the locking surfaces of a first panel connector overlie the intermediate locking surfaces of the second panel connector in a mechanically interlocking interference fit to lock the connectors together.

3. The structure of claim 1, said connectors being formed of plastic material, each said connectors having opposite flanges extending for the full length of said respective panel and extending inwardly toward one another in a common plane, said first and second panels each having lengthwise side grooves, said flanges of said connectors fitted in said side grooves for holding said connector to said respective panel.

4. The structure of claim 2, said connectors being formed of a plastic material, each said connectors having opposite flanges extending for the full length of said respective panel and extending inwardly toward one another in a common plane, said first and second panels each having lengthwise side grooves, said flanges of said connectors fitted in said side grooves for holding said connector to said respective panel.

5. An easily-assembled housing structure comprising: a plurality of generally planar panels, at least two of said panels being adjacent first and second panels each having snap-together panel connectors having forward facing sections for joining adjacent said first and second panels together to form interconnected panels by pushing them together with abutting confronting locking surfaces to prevent unsnapping of the connectors by attempting to pull the panels apart in the direction parallel to the plane of the panels and perpendicular to the forward facing sections, wherein said panels may be interconnected simply by inserting one connector into the other to lock the panels together;

said connectors of said interconnected first and second panels being identical but reversed from one another, each connector on each of said first and second panels having a body section joined to the respective panel, a tongue section having enlarged locking surfaces, a groove section having enlarged intermediate locking surfaces, and wherein the locking surfaces of a first panel connector overlie the intermediate locking surfaces of the second panel connector in a mechanically interlocking interference fit to lock the connectors together; and each said connector also having a central recess extending the full length of said respective panel, said recesses of interconnected connectors being aligned and confronting one another, and a bracing member fitted in said aligned recesses and extending fully into each recess.

6. The structure of claim 5, said first and second panels each having a structural post with a lengthwise central groove, said central recesses of said connectors seated within said central grooves for providing lateral shear strength to the connectors.

7. An easily-assembled housing structure comprising: a plurality of generally planar panels, at least two of said panels being adjacent first and second panels each having snap-together panel connectors having forward facing sections for joining adjacent said first and second panels together to form interconnected panels by pushing them together with abutting confronting locking surfaces to prevent unsnapping of the connectors by attempting to pull the panels apart in the direction parallel to the plane of the panels and perpendicular to the forward facing sections, wherein said panels may be interconnected simply by inserting one connector into the other to lock the panels together;

said connectors of said interconnected first and second panels being identical but reversed from one another, each connector on each of said first and second panels having a body section joined to the respective panel, a tongue section having enlarged locking surfaces, a groove section having enlarged intermediate locking surfaces, and wherein the locking surfaces of a first panel connector overlie the intermediate locking surfaces of the second panel connector in a mechanically interlocking interference fit to lock the connectors together; and each first and second said panel having a structural post with a lengthwise central groove, said connectors each having a lengthwise central recess, said central recesses of said connectors seated within said central grooves for providing lateral shear strength to the connectors.

8. An easily-assembled housing structure comprising:
a plurality of generally planar panels, at least two of said panels being adjacent first and second panels each having snap-together panel connectors having forward facing sections for joining adjacent said first and second panels together to form interconnected panels by pushing them together with abutting confronting locking surfaces to prevent unsnapping of the connectors by attempting to pull the panels apart in the direction parallel to the plane of the panels and perpendicular to the forward facing sections, wherein said panels may be interconnected simply by inserting one connector into the other to lock the panels together; and said forward facing section being a forward section, and further including a rearward section and opposite end sections, each of said forward sections of interconnected connectors having first means for snapping together, each of said end sections having second means for snapping together with a third connector on a third panel at right angles to said interconnected first and second panels.

9. An easily-assembled housing structure comprising:
a plurality of generally planar panels, at least two of said panels being adjacent first and second panels each having snap-together panel connectors having forward facing sections for joining adjacent said first and second panels together to form interconnected panels by pushing them together with abutting confronting locking surfaces to prevent unsnapping of the connectors by attempting to pull the panels apart in the direction parallel to the plane of the panels and perpendicular to the forward facing sections, wherein said panels may be interconnected simply by inserting one connector into the other to lock the panels together; and said forward facing section being a forward section, and further including a rearward section and a central section, said central section having a central recess extending rearwardly beyond the rearward section, said forward section having a tongue and a groove, the tongue having a pair of forwardly converging tongue side walls and opposite laterally extending first locking surfaces, said groove having forwardly diverging groove side walls and opposite laterally extending intermediate locking surfaces, the tongue side walls being elastically compressible to pass fully into said groove and said tongue locking surfaces abutting and confronting said groove intermediate locking surfaces to prevent removal of the tongue from the groove.

10. A connector for joining building panels together, comprising a body having a forward section, a rearward section, a central section, said central section having a central recess extending rearwardly beyond the rearward section, said forward section having a tongue and a groove, the tongue having a pair of forwardly converging tongue side walls and opposite laterally extending first locking surfaces, said groove having forwardly diverging groove side walls and opposite laterally extending intermediate locking surfaces, the tongue side walls being elastically compressible to pass fully into said groove and said tongue locking surfaces abutting and confronting said groove intermediate locking surfaces to prevent removal of the tongue from the groove.

11. The connector of claim 10, said body also having opposite facing end sections, each end section having a groove of the same shape as the groove of said forward section.

12. The connector of claim 10, each said rearward surface having opposite flanges located outwardly of the body and extending inwardly toward one another in a common plane.

13. The connector of claim 11, each said rearward surface having opposite flanges located outwardly of the body and extending inwardly toward one another in a common plane.

* * * * *